(12) United States Patent
Hoffmeister et al.

(10) Patent No.: US 9,070,367 B1
(45) Date of Patent: Jun. 30, 2015

(54) LOCAL SPEECH RECOGNITION OF FREQUENT UTTERANCES

(71) Applicant: Amazon Technologies, Inc., Reno, NV (US)

(72) Inventors: Bjorn Hoffmeister, Seattle, WA (US); Jeffrey O'Neill, Somerville, MA (US)

(73) Assignee: Amazon Technologies, Inc., Reno, NV (US)

( * ) Notice: Subject to any disclaimer, the term of this patent is extended or adjusted under 35 U.S.C. 154(b) by 225 days.

(21) Appl. No.: 13/684,969

(22) Filed: Nov. 26, 2012

(51) Int. Cl.
*G10L 15/04* (2013.01)
*G10L 15/187* (2013.01)

(52) U.S. Cl.
CPC .................. *G10L 15/187* (2013.01)

(58) Field of Classification Search
USPC ............. 704/1–10, 243, 235, 244, 255, 256, 704/270, 251, 231, 250, 270.1, 254
See application file for complete search history.

(56) References Cited

U.S. PATENT DOCUMENTS

| | | | |
|---|---|---|---|
| 6,185,535 B1* | 2/2001 | Hedin et al. | 704/270 |
| 2005/0246172 A1* | 11/2005 | Huang | 704/243 |
| 2012/0271631 A1* | 10/2012 | Weng et al. | 704/243 |

* cited by examiner

*Primary Examiner* — Huyen Vo
(74) *Attorney, Agent, or Firm* — Seyfarth Shaw LLP

(57) ABSTRACT

In a distributed automated speech recognition (ASR) system, speech models may be employed on a local device to allow the local device to process frequently spoken utterances while passing other utterances to a remote device for processing. Upon receiving an audio signal, the local device compares the audio signal to the speech models of the frequently spoken utterances to determine whether the audio signal matches one of the speech models. When the audio signal matches one of the speech models, the local device processes the utterance, for example by executing a command. When the audio signal does not match one of the speech models, the local device transmits the audio signal to a second device for ASR processing. This reduces latency and the amount of audio signals that are sent to the second device for ASR processing.

20 Claims, 13 Drawing Sheets

LOCAL SPEECH RECOGNITION OF FREQUENT UTTERANCES

BACKGROUND

Human-computer interactions have progressed to the point where humans can control computing devices, and provide input to those devices, by speaking Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

In certain automatic speech recognition (ASR) systems, it may be desirable to divide ASR tasks between a local device and a remote device to improve efficiency and processing results. Remote devices may have more computing power than local devices, but local devices may be able to return results to a user more quickly due to their proximity to the user. To take advantage of such a divided or distributed ASR system, a local device may identify and perform local ASR processing on frequently used phrases or words in an audio signal and transmit the audio signal to another device or system for ASR processing when the local device does not recognize a frequently used phrase or word in the audio signal. Offered is a method and system to create speech recognition models of frequently spoken phrases or words for use by the local device in processing an audio signal. The local device may transmit the audio signal or a portion thereof to a remote device for ASR processing of the audio signal.

Figure 1:
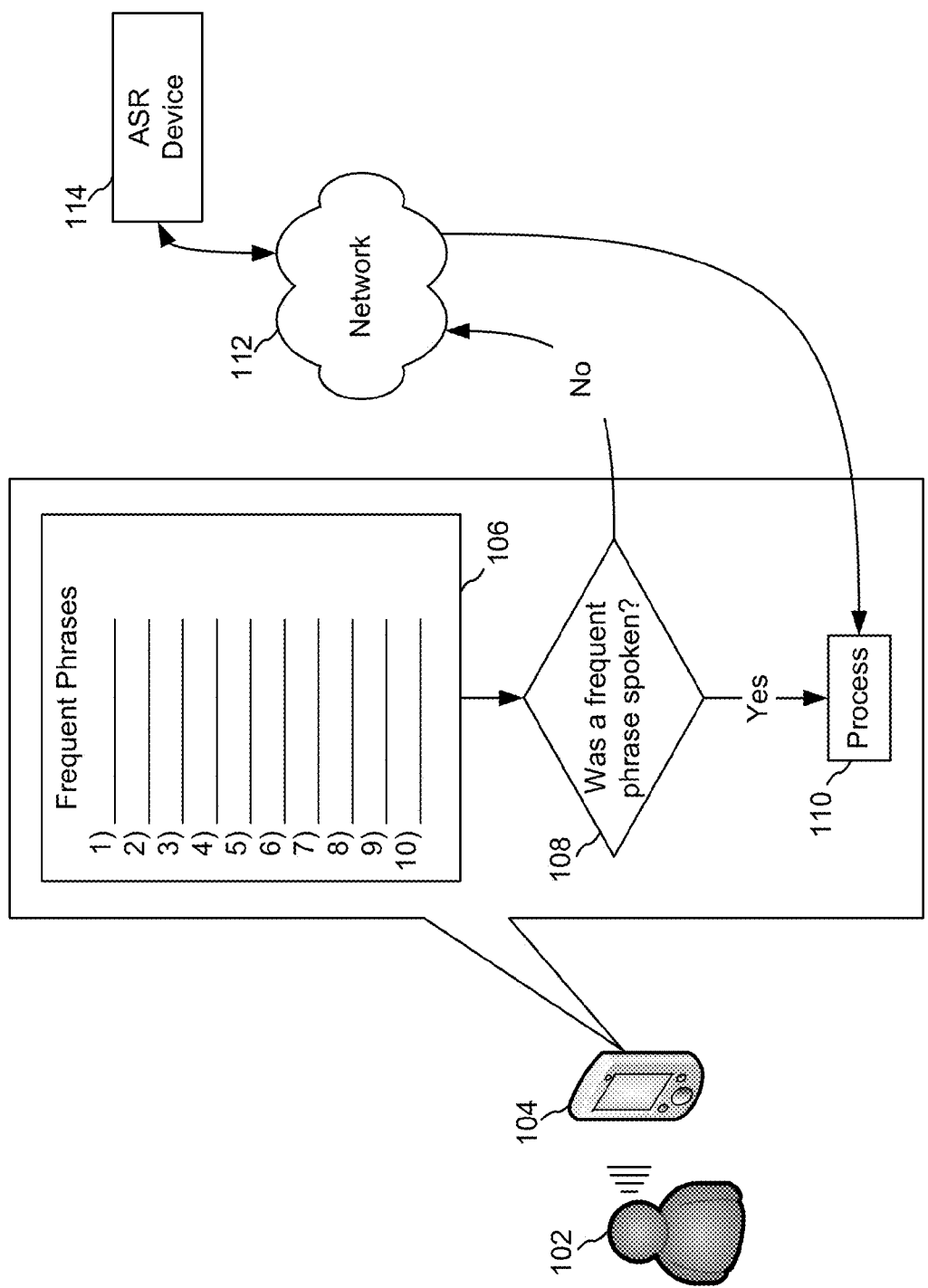
FIG. 1 illustrates speech model matching of frequent phrases according to one aspect of the present disclosure.

FIG. 1 illustrates local ASR processing of frequent phrases or words, according to one aspect of the present disclosure. FIG. 1 illustrates a user 102, a local device 104 for processing one or more frequent phrases or words, a network 112, and a remote ASR device 114 in communication with the local device 104 over the network 112. In one aspect of the present disclosure, the local device 104 receives an audio input from the user 102. The local device 104 compares the audio input to one or more speech recognition models for frequent phrases or words 106. The local device 104 determines whether the audio input includes a frequent phrase or word, as shown in block 108. When the local device 104 determines that the audio input includes a frequent phrase, the local device 104 processes the frequent phrase, as shown in block 110. Depending on the phrase, the local processing may include executing a command corresponding with the phrase. When the local device 104 determines that the audio input does not include a frequent phrase, the local device 104 transmits the audio input to the remote ASR device 114 through the network 112 for ASR processing. After the remote ASR device 114 performs speech recognition on the audio input, the speech recognition results may be transmitted over the network 112 to the local device 104 for further operations.

In another aspect of the present disclosure, the local device 104 may transmit the entire audio input to the remote ASR device 114 over the network 112 for ASR processing in parallel with the local device 104. When the local device 104 identifies a frequent phrase in the audio input, the local device 104 may transmit an indication to the remote ASR device 114 informing the remote ASR device 114 that the local device 104 has recognized a frequent phrase and the remote ASR device 114 may forego ASR processing on the audio input.

Aspects of the present disclosure may allow for the reduction of latency in ASR processing by configuring a local device to process certain frequently encountered phrases or words. Aspects of the present disclosure may allow for the reduction of cost and server load, for example, for an ASR provider, by reducing the amount of audio transmitted for remote processing by a remote device or server. Aspects of the present disclosure may also allow for speech recognition processing by the local device when the local device is not in communication with the remote device or server.

Figure 2:
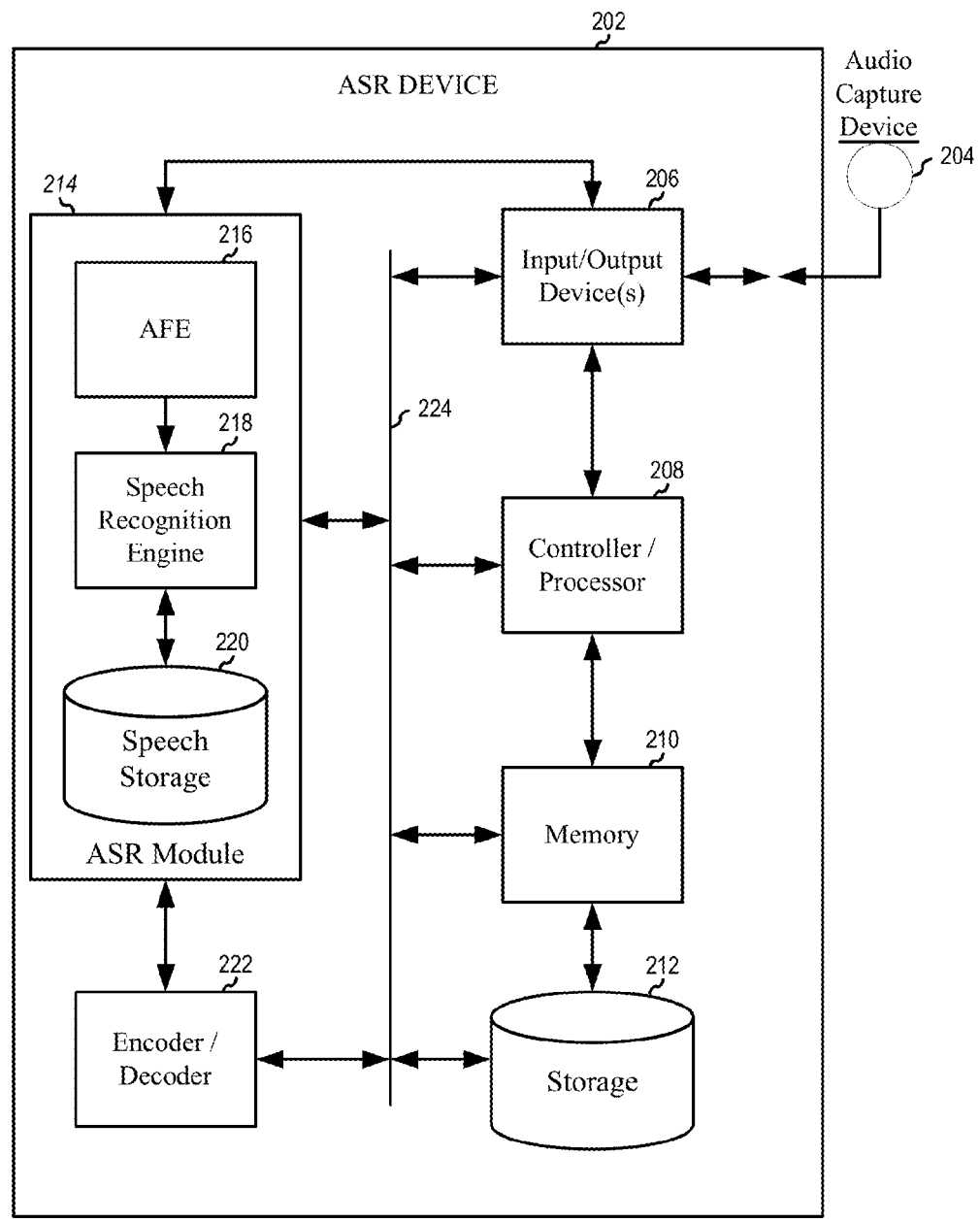
FIG. 2 is a block diagram conceptually illustrating a device for speech recognition according to one aspect of the present disclosure.

FIG. 2 shows an automatic speech recognition (ASR) device 202 for performing speech recognition. Aspects of the present disclosure include computer-readable and computer-executable instructions that may reside on the ASR device 202. FIG. 2 illustrates a number of components that may be included in the ASR device 202, however other non-illustrated components may also be included. Also, some of the illustrated components may not be present in every device capable of employing aspects of the present disclosure. Further, some components that are illustrated in the ASR device 202 as a single component may also appear multiple times in a single device. For example, the ASR device 202 may include multiple input/output devices 206 or multiple controllers/processors 208. In one aspect of the present disclosure, the local device 104 may be an ASR device, such as the ASR device 202, or include one or more components of the ASR device 202. Similarly, the remote ASR device 114 may include one or more ASR devices, such as the ASR device 202, or include one or more components of the ASR device 202.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 202 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 2, the ASR device 202 may include an audio capture device 204 for capturing spoken utterances for processing. The audio capture device 204 may include a microphone or other suitable component for capturing sound. The audio capture device 204 may be integrated into the ASR device 202 or may be separate from the ASR device 202. The ASR device 202 may also include an address/data bus 224 for conveying data among components of the ASR device 202. Each component within the ASR device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208).

The ASR device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM), and/or other types of memory. The ASR device 202 may also include a data storage component 212, for storing data and instructions. The data storage component 212 may include one or more storage types such as magnetic storage, optical storage, solid-state storage, etc. The ASR device 202 may also be connected to removable or external memory and/or storage (such as a removable memory card, memory key drive, networked storage, etc.) through the input/output device 206. Computer instructions for processing by the controller/processor 208 for operating the ASR device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

The ASR device 202 includes input/output device(s) 206. A variety of input/output device(s) may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206 the ASR device 202 may connect to a network, such as the Internet or private network, which may include a distributed computing environment.

The device may also include an ASR module 214 for processing spoken audio data into text. The ASR module 214 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., speech units or phonemes) and sequences of sounds to identify words and phrases that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 214 may output the most likely words or phrase recognized in the audio data. The ASR module 214 may also output multiple alternative recognized words or phrases in the form of a lattice or an N-best list (described in more detail below).

While a recognition score may represent a probability that a portion of audio data corresponds to a particular phoneme, word, or phrase, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, phrase etc.

The ASR module 214 may be connected to the bus 224, input/output device(s) 206, audio capture device 204, encoder/decoder 222, controller/processor 208 and/or other component of the ASR device 202. Audio data sent to the ASR module 214 may come from the audio capture device 204 or may be received by the input/output device 206, such as audio data captured by a remote entity and sent to the ASR device 202 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 204 and input/output device 206 may be configured to adjust the audio data based on traditional tradeoffs of quality versus data size or other considerations.

The ASR module 214 includes an acoustic front end (AFE) 216, a speech recognition engine 218, and speech storage 220. The AFE 216 transforms audio data into data for processing by the speech recognition engine 218. The speech recognition engine 218 compares the speech recognition data with the acoustic, language, and other data models and information stored in the speech storage 220 for recognizing the speech contained in the original audio data. The AFE 216 and speech recognition engine 218 may include their own controller(s)/processor(s) and memory or they may use the controller/processor 208 and memory 210 of the ASR device 202, for example. Similarly, the instructions for operating the AFE 216 and speech recognition engine 218 may be located within the ASR module 214, within the memory 210 and/or storage 212 of the ASR device 202, or within an external device.

Received audio data may be sent to the AFE 216 for processing. The AFE 216 may reduce noise in the audio data, identify parts of the audio data containing speech for processing, and segment and process the identified speech components. The AFE 216 may divide the digitized audio data into frames, with each frame representing a time interval, for example 10 milliseconds (ms). During that frame the AFE 216 determines a set of values, called a feature vector, representing the features/qualities of the utterance portion within the frame. Feature vectors may contain a varying number of values, for example forty. The feature vector may represent different qualities of the audio data within the frame. Feature vectors may be combined into a matrix that represents a time period of the spoken utterance. These feature vector matrices may then be passed to the speech recognition engine 218 for processing. A number of approaches may be used by the AFE 216 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 214 and sent to the input/output device 206 for transmission to another device for further processing. The feature vectors may be encoded and/or compressed by the encoder/decoder 222 prior to transmission. The encoder/decoder 222 may be customized for encoding and decoding ASR data, such as digitized audio data, feature vectors, etc. The encoder/decoder 222 may also encode non-ASR data of the ASR device 202, for example using a general encoding scheme such as .zip, etc. The functionality of the encoder/decoder 222 may be located in a separate component, as illustrated in FIG. 2, or may be executed by the controller/processor 208, ASR module 214, or other component, for example.

The speech recognition engine 218 may process the output from the AFE 216 with reference to information stored in the speech storage 220. Alternatively, post front-end processed data (such as feature vectors) may be received by the ASR module 214 from another source besides the internal AFE 216. For example, another entity may process audio data into feature vectors and transmit that information to the ASR device 202 through the input/output device(s) 206. Feature vectors may arrive at the ASR device 202 encoded, in which case they may be decoded (for example by the encoder/decoder 222) prior to processing by the speech recognition engine 218.

The speech storage 220 includes a variety of information for speech recognition such as data matching pronunciations of phonemes to particular words and/or phrases. This data may be referred to as an acoustic model. The speech storage may also include a dictionary of words or a lexicon. The speech storage may also include data describing words and/or phrases that are likely to be used together in particular contexts. This data may be referred to as a language or grammar model.

Other information may also be stored in the speech storage 220 for use in speech recognition. The contents of the speech storage 220 may be prepared for general ASR use or may be customized to include sounds, words, and phrases that are likely to be used in a particular application. For example, for ASR processing at an ATM, the speech storage 220 may include customized data specific to banking transactions. In certain instances, the speech storage 220 may be customized for an individual user based on his/her individualized speech input. To improve performance, the ASR module 214 may revise/update the contents of the speech storage 220 based on feedback of the results of ASR processing.

The speech recognition engine 218 attempts to match received feature vectors to language phonemes, words, and/or phrases as known in the speech storage 220. The speech recognition engine 218 computes recognition scores for the feature vectors based on acoustic information and language information. The acoustic information is used to calculate an acoustic score representing a likelihood that the intended sound represented by a group of feature vectors match a known language phoneme. The language information is used to adjust the acoustic score by considering what sounds and/or words are used in context with each other, thereby improving the likelihood that the ASR module outputs speech results that make sense grammatically.

The speech recognition engine 218 may use a number of techniques to match feature vectors to phonemes. One common technique is using Hidden Markov Models (HMMs). HMMs are used to determine probabilities that feature vectors may match phonemes. Using HMMs, a number of states are presented, in which the states together represent a potential phoneme and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 218, the state may change or stay the same, based on the processing of the new feature vectors. A Viterbi algorithm may be used to find the most likely sequence of states based on the processed feature vectors. In addition to calculating potential states for one phoneme as a potential match to a feature vector, the speech recognition engine 218 may also calculate potential states for other phonemes as potential matches for the feature vector. In this manner multiple states and state transition probabilities may be calculated. This process of determining scores based on the feature vectors may be called acoustic search.

Figure 3:
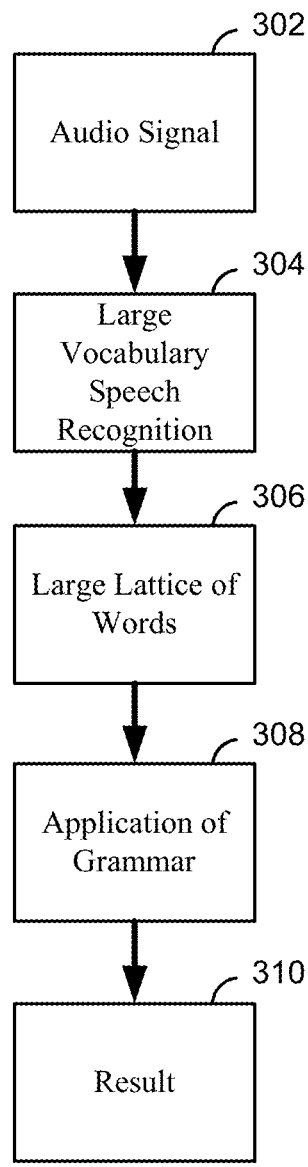
FIG. 3 illustrates large vocabulary speech recognition according to one aspect of the present disclosure.

In one aspect of the present disclosure, ASR processing of the frequent phrases or words may be performed using large vocabulary continuous speech recognition (LVCSR). FIG. 3 illustrates a flow diagram of performing speech recognition using LVCSR. An audio signal 302 may be received and LVCSR 304 is performed. Performing the LVCSR may include using models (particularly acoustic models, though language models may also be used) to determine whether the audio signal is or includes a frequently spoken utterance. The LVCSR may be based on HMMs and Gaussian mixture models. Upon receiving an audio signal, feature vectors may be matched with phonemes. Based on the feature vector, the phoneme may be assigned a score based on how closely the feature vector matches a distribution associated with a phoneme within one or more acoustic models. Probable phoneme matches may be formed into paths, in which each path represents a progression of phonemes that potentially match the audio data represented by the feature vectors. A cumulative path score may also be calculated for each path.

Scores of branches of the paths may be computed based on language models or grammars. Language modeling involves determining scores for what words are likely to be used together to form coherent words and sentences. Application of a language model may improve the likelihood of correctly interpreting the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 4:
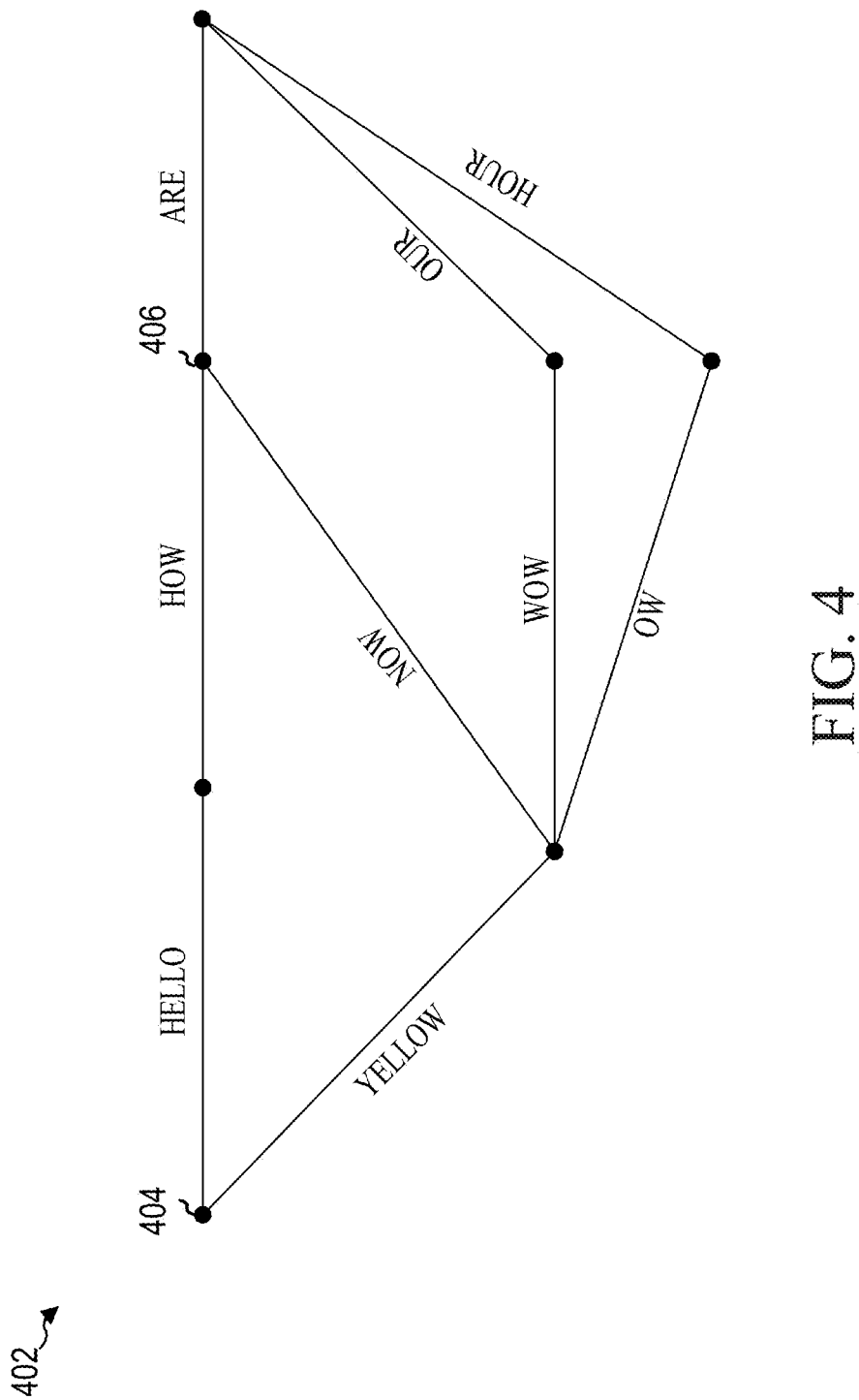
FIG. 4 illustrates a speech recognition lattice according to one aspect of the present disclosure.

The LVCSR 304 may combine potential paths and generate a lattice 306 representing potential speech recognition results. A sample lattice is shown in FIG. 4. The lattice 402 shows multiple potential paths of speech recognition results for the spoken utterance "Hello, how are . . . ". Paths between nodes represent potential words (for example "hello", "yellow", etc.). The two paths between node 404 and node 406 represent two potential word choices, "hello how" or "yellow now".

A grammar 308 of sequences of one or more words for the frequent phrases or words may be applied to identify whether the audio signal is or includes a frequently spoken utterance. Each path point between nodes (such as a potential word) is associated with a recognition score based on the acoustic model score, the language model score, the grammar, and/or other factors. Each path across the lattice may also be assigned a recognition score. An ASR result 310 may be returned based on the recognition score. In one aspect, the result 310 may be the path with the highest recognition score. In another aspect, the result 310 may identify the frequent phrase or word, or that no frequent phrase or word has been identified. In another aspect, the result 310 may include determining a frequent phrase or word has been spoken and performing a command associated with the frequent phrase or word. In yet another aspect, the result 310 may be a lattice smaller than the lattice generated by the LVCSR 304.

Figure 5:
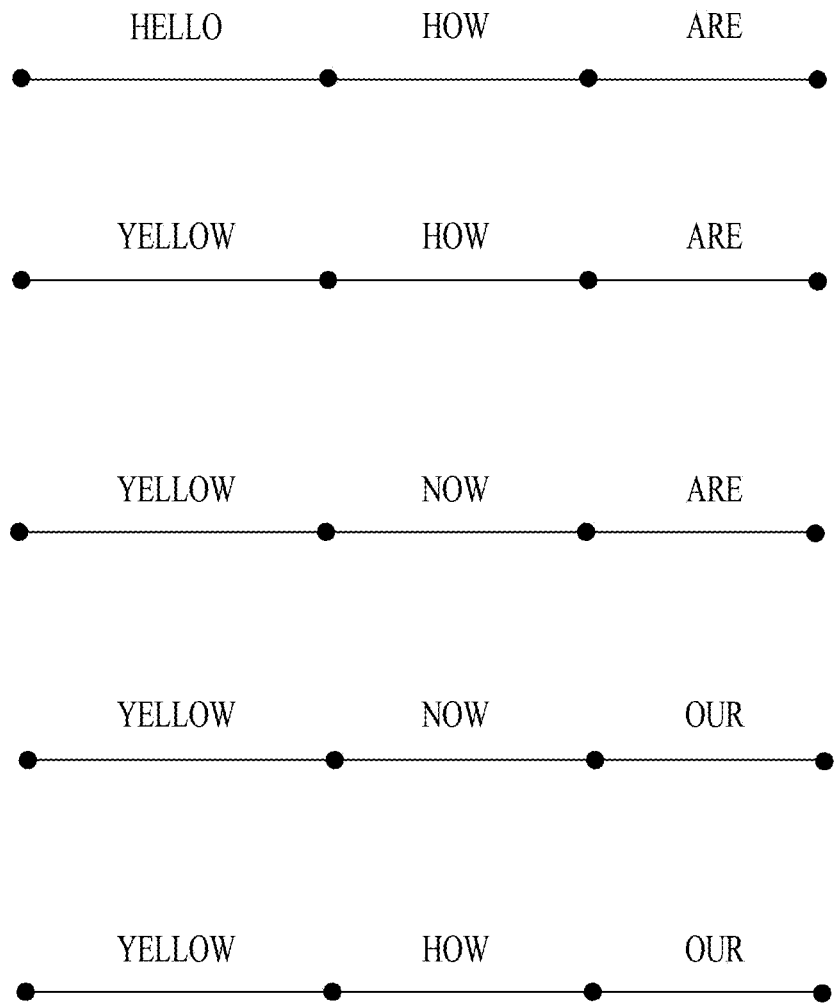
FIG. 5 illustrates an N-best list according to one aspect of the present disclosure.

In another aspect, the LVCSR 304 may generate an N-best list of paths which can be processed by the application of the grammar 308. FIG. 5 shows an exemplary N-best list returned for processing of a three-word path. As described above, the grammar 308 representing the frequent phrases or words may be applied to identify whether the audio signal is or includes a frequently spoken utterance. The grammar 308 may also output an N-best list along with the respective recognition scores. In other aspects, an application (for example, a program or component either internal or external to the ASR device 202) that receives the N-best list may then perform further operations or analysis on the list given the list and the associated recognition scores.

In one aspect of the present disclosure, ASR processing of the frequent phrases or words may be performed using phrase models. A phrase model may be created for each frequent phrase or word. When identifying whether an audio input includes a frequent phrase, the ASR device may attempt to identify whether the sounds of the frequent phrase are included in the input through application of an acoustic model for the phrase, without performing additional language model processing that might otherwise be called for when performing traditional ASR. In one aspect, the phrase models may be created based on phoneme models (or other subword units). In this aspect, a phoneme model is akin to an acoustic model. Phoneme models relevant to the frequent phrase may be concatenated to create a model for the entire frequent phrase. A custom HMM may be created for each frequent phrase by concatenating the HMM states for the relevant phonemes together. In another aspect, the phrase models for the frequent phrases may be created based on stored audio or speech. In this aspect, the custom HMM for each frequent phrase may be created based on the stored audio. In some aspects, the states of the custom HMM may not explicitly correspond to phonemes or subword units. For example, a custom HMM of 10 states could be created for a frequent phase and during the training process each of the 10 states would be aligned with a portion of the frequent phrase. The division of the frequent phrase into the portions may be arbitrary and not correspond to phoneme or other subword unit boundaries.

Figure 6:
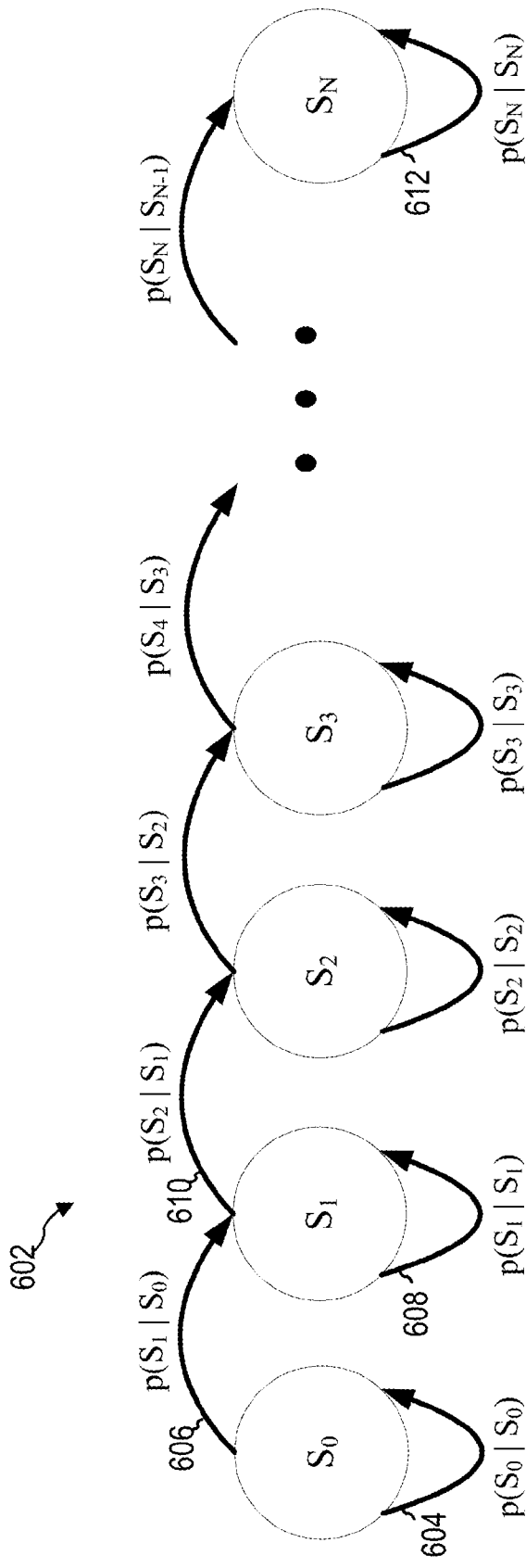
FIG. 6 illustrates speech recognition using a phrase model according to one aspect of the present disclosure.

The custom HMMs may have a varied number of states describing the different frequent phrases for processing the audio signal input to determine whether the audio signal is a frequent phrase. An example custom HMM for a frequent phrase is illustrated in FIG. 6. The frames of the entire frequent phrase may be processed through use of the custom HMM 602. An HMM may have two sets of probabilities. First, an HMM may have state transition probabilities that indicate probabilities for staying in the same state or progressing to the next state (in some aspects, states may be skipped as well). Second, each state may compute a generation probability that the frame was generated by the state (this probability may be modeled, for example, by a Gaussian mixture model).

During processing, a determination is made as to whether the state should either remain the same, or change to a new state. For example, whether the state should remain state $S_0$ may depend on the transition probability 604 (written as $P(S_0|S_0)$, meaning the probability of staying at state $S_0$), the transition probability 606 (written as $P(S_1|S_0)$, meaning the probability of transitioning from state $S_0$ to $S_1$), the generation probability that the subsequent frame (denote as f) was generated by state $S_0$ (written as $P(f|S_0)$, not shown), and the generation probability that the subsequent frame was generated by state $S_1$ (written as $P(f|S_1)$, not shown). If state $S_1$ is the most probable, the calculations move to state $S_1$ and continue from there. For subsequent frames, it is similarly determined whether the state should remain at $S_1$, using the transition probability represented by $P(S_1|S_1)$ 608, or move to the next state, using the transition probability $P(S_2|S_1)$ 610. As the processing continues such probabilities continue to be calculated including the probability 612 of remaining in state $S_N$ or the probability of moving from a state of the illustrated phrase to a state of another phrase.

The probabilities and states may be calculated using a number of techniques. For example, probabilities for each state may be calculated using a Gaussian model, Gaussian mixture model, or other techniques based on the phrase. Techniques such as maximum likelihood estimation (MLE) may also be used to estimate the probability of the states. To determine the optimum path through the HMM techniques such as a Viterbi algorithm, pruning, or a beam search may be used.

Figure 7:
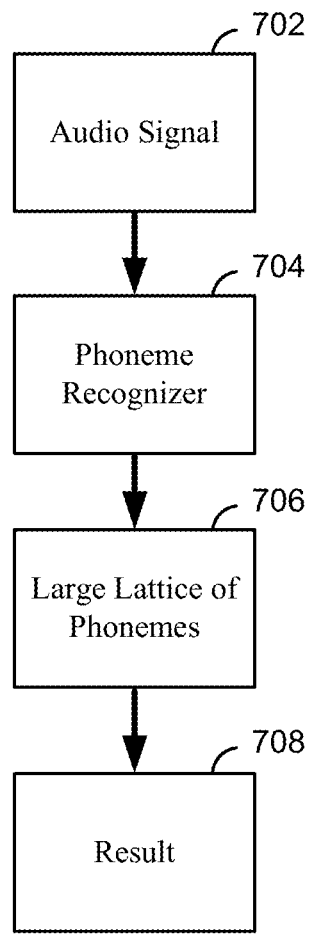
FIG. 7 illustrates speech recognition using a phoneme recognizer according to one aspect of the present disclosure.

In one aspect of the present disclosure, ASR processing of the frequent phrases or words may be performed using a phoneme recognizer. FIG. 7 illustrates a flow diagram of using a phoneme recognizer to perform speech recognition. An audio signal 702 may be received by the phoneme recognizer 704. The phoneme recognizer 704 may process the audio signal using acoustic models and phoneme models (e.g., n-grams of phoneme sequences) to determine whether the audio signal is or includes a frequently spoken utterance. For example, upon receiving an audio signal, feature vectors may be matched with phonemes based on HMMs. Based on the feature vector, the phoneme may be assigned a score based on how closely the feature vector matches a distribution associated with a phoneme within one or more acoustic models. Probable phoneme matches may be formed into paths, in which each path represents a progression of phonemes that potentially match the audio data represented by the feature vectors. A cumulative path score may also be calculated for each path. Scores of branches of the paths may be computed based on phoneme models, language models, or grammars. The phoneme recognizer 704 may apply a grammar of sequences of one or more words for the frequent phrases or words to identify whether the audio signal is or includes a frequently spoken utterance. Each path point between nodes (such as a potential phoneme) is associated with a recognition score based on the acoustic model score, the language model score, the grammar, and/or other factors. For example, a feature vector for a phoneme may be processed through the states of a HMM, in a similar manner as described above with reference to FIG. 6. After processing the feature vectors for last state in the HMM for the phoneme, the process may move to the next phoneme in the utterance.

The phoneme recognizer 704 may combine potential paths and generate a lattice 706 representing potential speech recognition results. Each path across the lattice may also be assigned a recognition score. In this aspect, the lattice 706 may include multiple potential paths of speech recognition results, in which the paths between nodes represent potential phonemes.

An ASR result 708 may be returned based on the recognition score. Similar to the result described with reference to FIG. 3, the result 708 may be the path with the highest recognition score, may identify the frequent phrase or word, or that no frequent phrase or word has been identified, may include determining a frequent phrase or word has been spoken and performing a command associated with the frequent phrase or word, or may be a lattice smaller than the lattice generated by the phoneme recognizer 704. Similar to the LVCSR 304 described above, the phoneme recognizer 704 may generate an N-best list of paths. The phoneme recognizer 704 may also output an N-best list along with the respective recognition scores.

Figure 8:
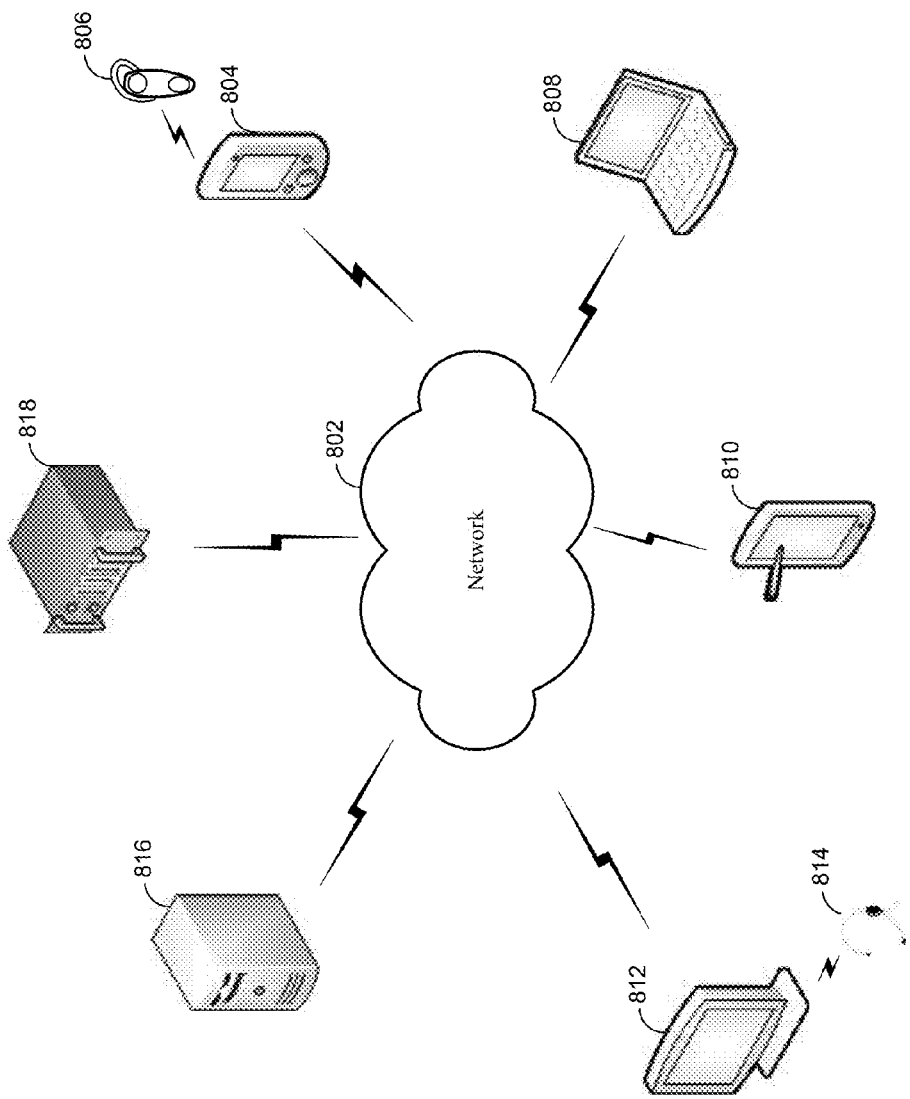
FIG. 8 illustrates a computer network for use with distributed speech recognition according to one aspect of the present disclosure.

Referring back to FIG. 2, following ASR processing, the ASR results may be sent by the ASR module 214 to another component of the ASR device 202, such as the controller/processor 208 for further processing (such as execution of a command included in the interpreted text) or to the input/output device 206 for sending to an external device. Multiple ASR devices 202 may be connected over a network. As shown in FIG. 8 multiple devices may be connected over network 802. Network 802 may include a local or private network or may include a wide network such as the internet. Devices may be connected to the network 802 through either wired or wireless connections. For example, a wireless device 804 may be connected to the network 802 through a wireless service provider. Other devices, such as computer 812, may connect to the network 802 through a wired connection. Other devices, such as laptop 808 or tablet computer 810 may be capable of connection to the network 802 using various connection methods including through a wireless service provider, over a WiFi connection, or the like. Networked devices may input spoken audio through a number of audio input devices including through headsets 806 or 814. Audio input devices may be connected to networked devices either through a wired or wireless connection. Networked devices may also include embedded audio input devices, such as an internal microphone (not pictured) in laptop 808, wireless device 804 or table computer 810.

In certain ASR system configurations, one device may capture an audio signal and another device may perform the ASR processing. For example, audio input to the headset 814 may be captured by computer 812 and sent over the network 802 to computer 816 or server 818 for processing. Or computer 812 may partially process the audio signal before sending it over the network 802. Because ASR processing may involve significant computational resources, in terms of both storage and processing power, such split configurations may be employed where the local device capturing the audio has lower processing capabilities than a remote device and higher quality ASR results are desired. The audio capture may occur near a user and the captured audio signal sent to another device for processing.

One tradeoff of the distributed ASR configuration shown in FIG. 8 is that remote ASR processing may introduce additional latency into the system and may delay obtaining ASR results. As a user may repeat certain phrases more than others, a local ASR device may be configured to perform local ASR processing on frequently spoken phrases or words and to send other phrases or words to a remote device for remote ASR processing. In this manner a distributed ASR system may be configured to efficiently processes frequent phrases with a local device while also allowing for other phrases to be processed using remote devices with potentially more computing power.

Such a system may be particularly desired when the frequent phrases include commands spoken by a user. For example, a user may frequently instruct his/her device to "check voicemail" or ask "what's the weather tomorrow?" If the local device is configured to always send the audio input to a remote device for ASR processing, the user may experience an unsatisfactory delay while the audio is sent to the remote device, processed into text, the text is sent back to the local device, and the local device executes the spoken command. It may also be unsatisfactory to configure a local device to perform all ASR processing, as the capability to do so may be computationally expensive without resorting to using a remote ASR device.

In the present disclosure, a local device is configured to match input audio data to a list of frequently spoken phrases. Audio that does not match the list of frequently spoken phrases or words may be passed to the remote ASR device for processing. The audio data which does match the list of frequently spoken phrases or words may be processed by the local device. Particularly in the case of commands, this configuration reduces latency for performing the frequently spoken commands.

Figure 9:
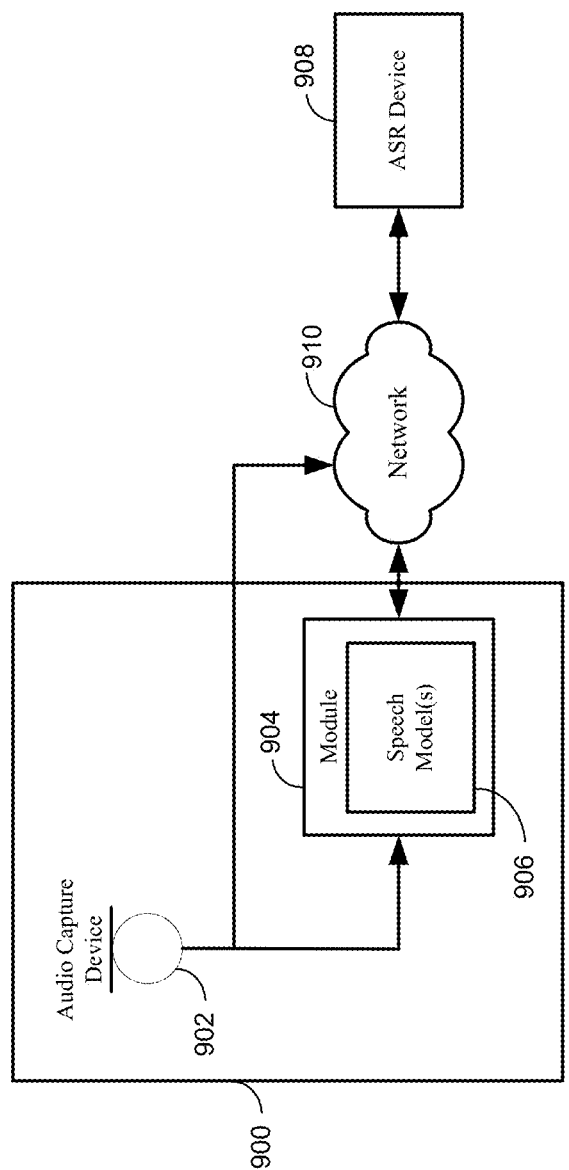
FIG. 9 illustrates a system for performing speech model matching according to one aspect of the present disclosure.

One configuration of the present disclosure is shown in FIG. 9. In this configuration, a first device or local device 900 may include an audio capture device 902 and a module 904 including one or more speech recognition models 906. The audio capture device 902 may also be located external to the local device 900. The module 904 is configured to recognize frequently spoken utterances or words using the speech recognition models 906. The configuration of such a module and the speech recognition models 906 is discussed above, and in further detail below. A second device or remote device 908 is in communication with the local device 900 over a network 910. The two devices may be examples of ASR devices 202 with different configurations, or may be other devices. The network 910 may be a wide area network such as the Internet, a local area network, a network allowing physical connection of the devices, a wireless communication network, or other suitable connection between the devices including a direct (wired or wireless) connection.

Audio comprising speech is captured by the audio capture device 902 and an audio signal is produced. The audio signal is compared to the speech recognition model(s) 906 by the module 904 to determine whether the audio signal is a frequent phrase or word matching a speech recognition model 906. When the audio signal matches a speech recognition model 906, the audio signal is processed by the local device 900. When the audio signal does not match a speech recognition model 906, the audio signal is transmitted over the network 910 by the local device 900 to the remote device 908 for ASR processing.

In another aspect, the local device 900 transmits the audio signal over the network 910 to the remote device 908 prior to or at the same time as comparing the audio signal to the speech recognition model(s) 906. This allows the local device 900 and the remote device 908 to perform ASR processing in parallel. In this aspect, when the local device 900 identifies that the audio signal is a frequent phrase or word, the local device 900 can transmit a communication, such as a cancel command, to the remote device 908 informing the remote device 908 that the remote device 908 does not need to perform ASR processing on the audio signal.

In yet another aspect, the audio signal may include a frequent phrase or word along with additional speech. In this aspect, the local device 900 may process the portion of the audio signal containing the frequent phrase or word and transmit all or only a remainder (such as the additional speech) of the audio signal over the network 910 to the remote device 908 for ASR processing. When the audio signal is processed in parallel by the local device 900 and the remote device 908, the local device 900 may transmit a communication, such as a cancel command, to the remote device 908 informing the remote device 908 that the remote device 908 does not need to perform ASR processing on the portion of the audio signal containing the frequent phrase or word.

The speech recognition models may be based on the frequency with which each of the spoken utterances are spoken by the user. Initially, such as when the user first purchases the local device, the local device may not have speech recognition models for frequent phrases or words, or the local device may include a default set of speech recognition models. For each spoken utterance processed by the local device, the local device may keep a count of the number of times each spoken utterance was spoken. Similarly, for each spoken utterance transmitted to and processed by the remote device, the remote device may keep a count of the number of times each spoken utterance was spoken. The utterances having the largest count may be considered frequent utterances or frequent phrases.

In one aspect, the local device may initially send all of the audio signals received over the network to the remote device for ASR processing and storage. Over a period of time a number of audio signals may be stored by the remote device. The remote device may keep a count of the number of times each spoken utterance was spoken to determine which audio signals or spoken utterances are most frequently spoken by the user. The local device (or a different device altogether) may also count of the number of times each spoken utterance was spoken to create a list of frequently spoken utterances. The count kept by the local device may be transmitted by the local device to the remote device which merges the count kept by local device with the count kept by the remote device. The remote device may then create the speech recognition models for the frequently spoken utterances, such as the utterances having the largest count, and transmit the speech recognition models to the local device. The local device (or a different device altogether) may create the speech recognition models for the frequently spoken utterances. The speech recognition models may also be updated periodically to reflect current frequently spoken utterances by the user.

In one aspect, the list of frequently spoken utterances or words and the corresponding speech recognition models may be based on frequent utterances not only of the user of a local device, but also other users. For example, when a local device is first operated, it may be configured with a default list of frequent utterances compiled by a remote device which may have tallied frequent utterances by multiple users. In this manner, the list of frequent utterances or words may be some combination of utterances frequently spoken by the user of a local device or by other users.

In another aspect, the list of frequently spoken utterances may be configured to change based on circumstances of use of the local device. For example, a local device may experience one set of frequently spoken utterances during the morning and a different set of frequently spoken utterances in the evening. In this example, the local device may alternate between lists of frequently spoken utterances based on the time of day. In other examples the local device may alternate between lists of frequently spoken utterances based on other factors such as geographic location, network connection, battery life, time of year, etc.

Figure 10:
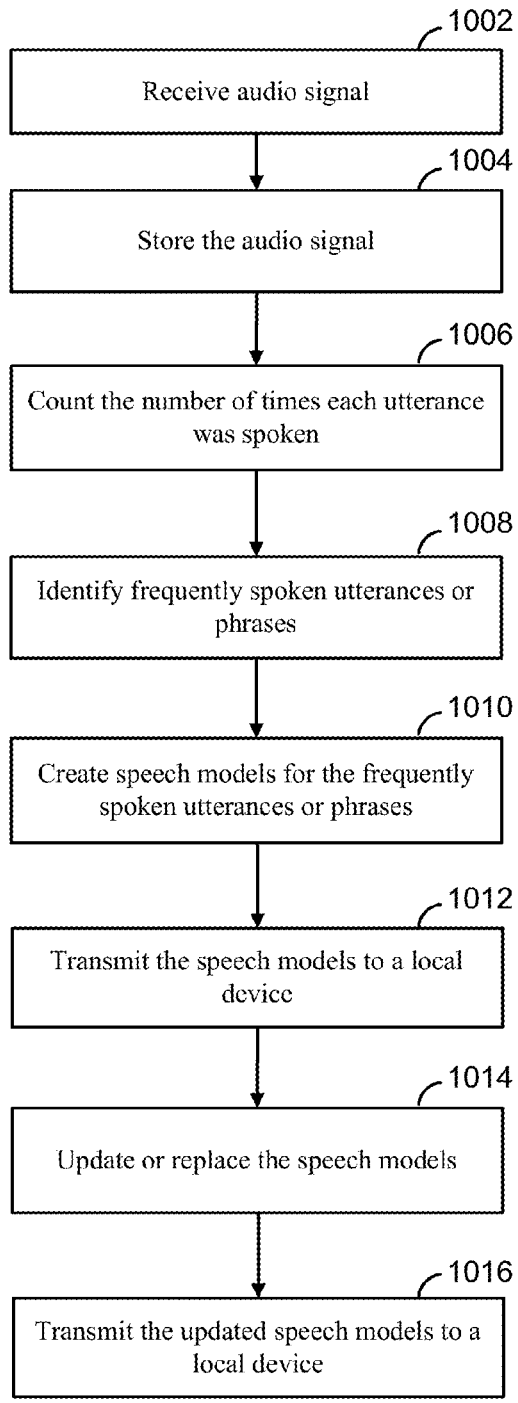
FIG. 10 illustrates a flow diagram of creating speech recognition models according to one aspect of the present disclosure.

As illustrated in FIGS. 9 and 10, to determine which spoken utterances to create speech recognition models for, a device receives an audio signal, as shown in block 1002. The audio signal may be received by the local device 900 from the audio capture device 902 or may be received by the remote device 908 from the local device 900. The device stores the audio signal including the spoken utterance by the user, as shown in block 1004. The audio signals may be stored in the memory, such as memory 210, or a database, such as speech database 220, of the device. The local device and/or the remote device may analyze or count the number of times each spoken utterance was spoken to determine which audio signals or spoken utterances are most frequently spoken by the user, as shown in block 1006. For example, the device may determine the number of times a spoken utterance or word was spoken by the user over a period of time, for example, minutes, hours, days, weeks, months, etc. The local device and the remote device may each keep count of each spoken utterance processed by each device, respectively, and merge the counts to determine which audio signals or spoken utterances are most frequently spoken by the user.

The device identifies a number of the most frequently spoken utterances or words, for example, the top five, ten, etc. most frequently spoken utterances or words, or the top one, two, three percent, etc. of most frequently spoken utterances or words, as shown in block 1008. The device creates the speech recognition models for the number of the most frequently spoken utterances, as shown in block 1010. If the device creating the speech recognition models is remote, it may transmit the speech recognition models to the local device, as shown in block 1012. The speech recognition models may also be updated or replaced as new information is collected, as shown in block 1014, and the updated speech recognition models may, if necessary, be transmitted to the local device, as shown in block 1016. The speech recognition models may be updated or replaced in real-time or on a periodic basis, for example, based on a number of minutes, hours, days, weeks, months, etc., to reflect current spoken utterances frequently spoken by the user. In updating the speech recognition models, the local device may keep count of each spoken utterance processed by the local device and transmit the information to the remote device. This allows the remote device to take into account the spoken utterances that were not transmitted to the remote device in determining which audio signals or spoken utterances are most frequently spoken by the user.

Referring back to FIG. 9, in one aspect of the present disclosure, the speech recognition model(s) 906 may be created by the remote device 908 or ASR system and transmitted over the network to the local device 900. The local device 900 stores the speech recognition model(s) 906. The speech recognition model(s) 906 may be stored by the local device 900 in memory 210, in the speech database 220 or elsewhere. In this aspect, the speech recognition model(s) 906 may be created for frequently spoken utterances by the user.

The speech recognition models may be phrase models, as described above, including sequences of states describing each of the one or more words and phrases. For example, if there are ten frequent words or phrases for which speech recognition models are created, then there may be a sequence of 10-20 states configured to match each of the frequent utterances. For example, the local device may use the custom HMMs, as described above, having a varied number of states describing the different words and phrases for processing the audio signal input to determine whether the audio signal matches one of the speech recognition models. The custom HMMs may be created by the remote device 908. In one aspect, the remote device 908 may concatenate the HMM states for the relevant phonemes to create the custom HMMs or each frequent phrase and send the custom HMMs to the local device 900. In another aspect, the remote device 908 may create the custom HMMs based on audio received from the local device 900 and stored by the remote device 908, for example, in the speech database 220 or elsewhere. Various other techniques may be used to create and process the speech models. For example, in aspects of the present disclosure, a keyword lexicon or keyword spotter, a phrase lexicon or phrase detector, a phoneme recognizer, a finite state transducer, an acoustic model, a language model, LVCSR, or any combination thereof may be used to determine whether all or a portion of the audio signal matches one of the speech recognition models.

In one aspect, two types of models may be created, a foreground model and a background model. Foreground models may include the speech recognition models or phrase models describing the one or more frequently used words and phrases, and the background model may model general speech other than the frequently used words and phrases. For example, the background model may include models for each phoneme describing the acoustic representation of potential phonemes of the audio signal. The background model may also include models for non-speech, such as silence and noise. The local device may process the audio signal through the foreground models and the background model, in parallel or in series, and score the probability that the audio signal matches the speech recognition models. The local device then compares the scores to determine whether the audio signal corresponds to the one or more frequently used words or phrases or matches the background model. For example, the local device may select the model having the highest score as the result. In some embodiments, the local device may only select the model having the highest score where the difference between the highest score and the second highest score exceeds a threshold. This threshold may be set by a user, determined experimentally, or set in other ways. In one aspect, a confidence computation is performed on the recognized frequent word or phrase and the confidence is compared to a threshold to determine whether to select the model. The confidence may be computed in several ways, for example, based on the probabilities, recognition scores, likelihood scores, strength of competing models, classification information, and other information. Where the threshold is not satisfied, the audio may be transmitted to the remote device for further processing. The threshold may be adjusted based on a desired sensitivity to matching the speech recognition models.

In other aspects, the local device may process the audio signal through each of the speech recognition models for the frequently used words or phrases and score the probability that the audio signal matches the speech recognition models. There may then be a confidence and threshold, depending on the desired setting, that the score must meet or exceed in order to be identified as matching a speech recognition model.

In other aspects of the present disclosure, the local device may perform front-end processing of the audio signal and transmit the results of the processing, for example, end-pointing, feature vectors after processing by an AFE, and other front-end processing results, in addition to or instead of the audio signal to the remote device for performing ASR processing. In another aspect, when the local device uses a phoneme recognizer to determine whether all or a portion of the audio signal matches one of the speech recognition models of frequently used utterances, the local device may transmit the phoneme letters, in addition to or instead of the audio signal, to the remote device.

Figure 11:
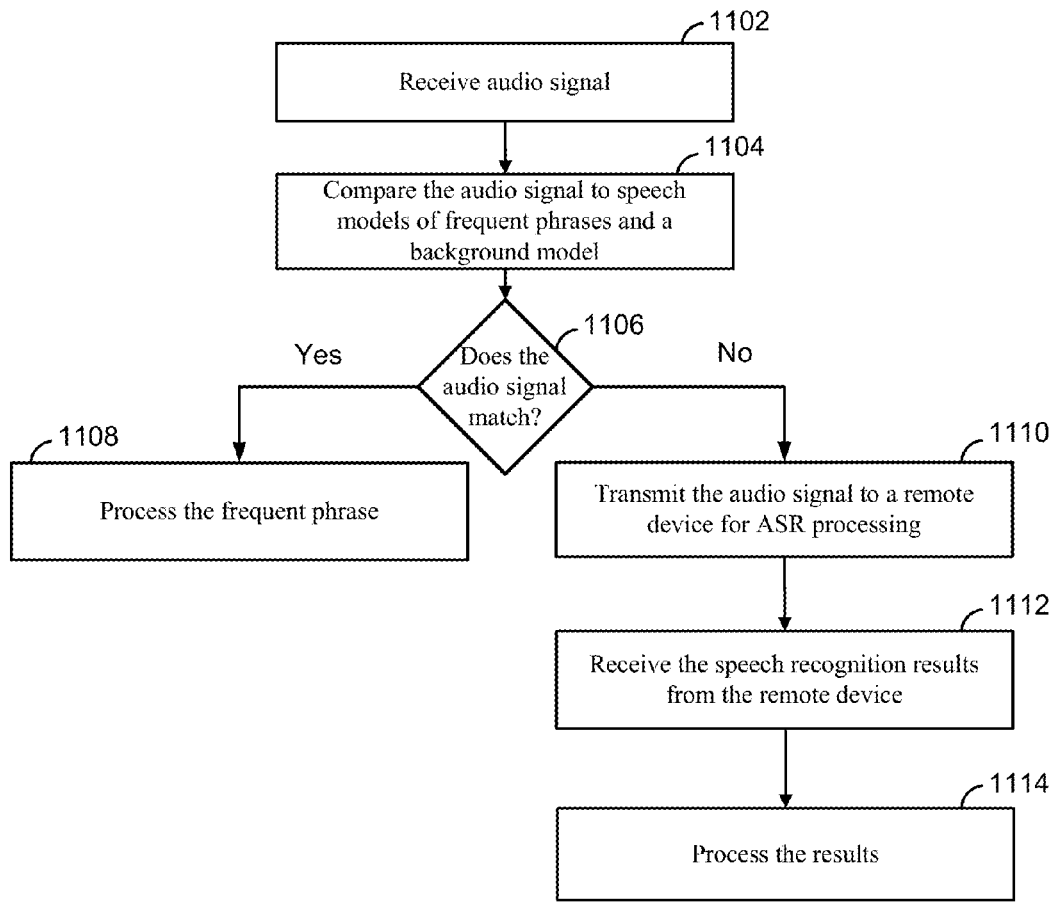
FIG. 11 illustrates a flow diagram of performing speech model matching according to one aspect of the present disclosure.

In one aspect of the present disclosure, the local device is a mobile device or cellular phone. Speech model matching may be performed by the local device, as illustrated in FIG. 11. As shown in FIG. 11, the local device receives an audio signal, as shown in block 1102. The audio signal may be a command word or phrase, for example, to be performed by the local device or remote device. Upon receiving the audio signal, the local device compares the audio signal to one or more speech recognition models for frequently spoken phrases and optionally a background model for general speech other than the frequently spoken phrases, as shown in block 1104, and makes a determination as to whether the audio signal corresponds to a speech recognition model for a frequently spoken phrase, as shown in block 1106. When the local device determines the audio signal matches a frequently spoken phrase corresponding to one of the speech recognition models, the local device processes the phrase, as shown in block 1108. In one aspect, the processing includes executing a command included to the utterance. For example a "call mom" command may be included in one of the speech recognition models as a frequently spoken utterance by the user. The processing of the "call mom" phrase may include starting a phone application of the local device and calling the desired phone number. In another example the command may include operations to be performed by a remote device. For example, a command of "order pizza for dinner" may instigate a commercial transaction with a remote server. In another aspect, the text corresponding to the recognized command may be sent to a server for processing.

In one aspect, if a local device recognizes a frequently spoken command as part of the frequent phrases list, the local device may proceed directly to execution of the command, rather than generating ASR results including the text of the command, and then processing the resulting text before executing the command. By way of illustration, if a speech recognition model includes a frequent phrase "call home", the local device may be configured to begin a telephone call to a user's home upon recognizing that this particular command in the frequent phrases is included in the audio signal data.

Figure 12:
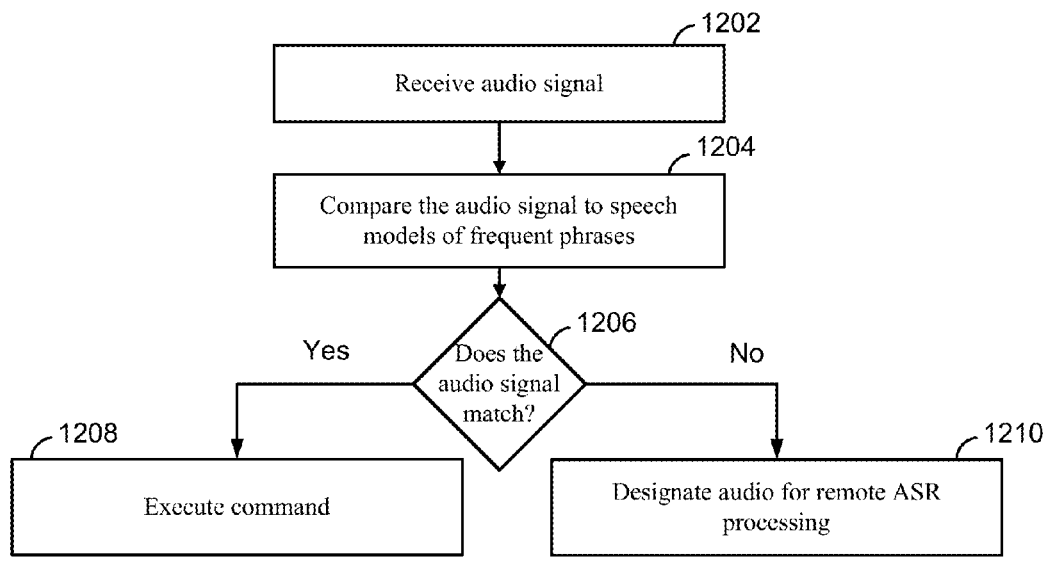
FIG. 12 illustrates a flow diagram of performing speech model matching and executing a command according to one aspect of the present disclosure.

Speech model matching and execution of a command may be performed by the local device, as illustrated in FIG. 12. As illustrated in FIG. 12, the local device receives an audio signal, as shown in block 1202. The audio signal may be a command word or phrase, for example, "call home". Upon receiving the audio signal, the local device compares the audio signal to one or more speech recognition models for frequently spoken phrases, as shown in block 1204, and makes a determination as to whether the audio signal matches a speech recognition model for frequently spoken phrases, as shown in block 1206. When the local device determines the audio signal is a command that matches a frequently spoken phrase of one of the speech recognition models, as shown in block 1208, the local device executes the command, for example, by initiating a telephone call to a user's home. When the local device determines the audio signal does not match a frequently spoken phrase of one of the speech recognition models, the local device may designate the audio signal for remote processing, as shown in block 1210. The remote processing may then proceed in the same manner as described below with reference to FIG. 11 for audio signals which do not include a frequently spoken phrase.

Referring again to FIG. 11, when the local device determines the audio signal does not match a frequently spoken phrase of one of the speech recognition models, the local device may transmit the audio signal to a remote device for ASR processing, as shown in block 1110. Upon the remote device performing the ASR processing, the remote device may transmit speech recognition results to the local device. The local device receives the results, as shown in block 1112, and processes the results, as shown in block 1114. The processing of the results may include executing a command.

Figure 13:
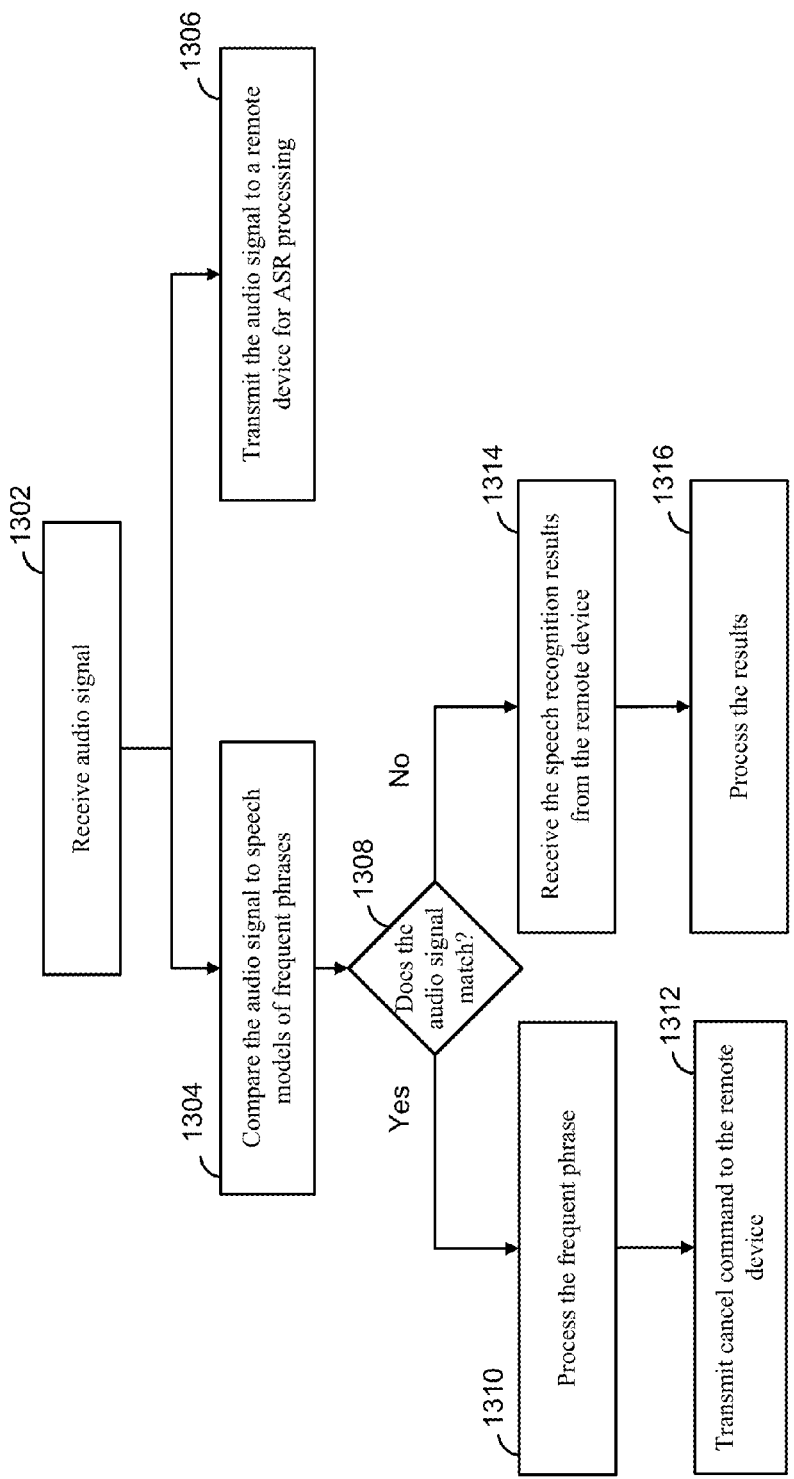
FIG. 13 illustrates a flow diagram of performing speech model matching according to one aspect of the present disclosure.

In another example, to speed up ASR processing should an input audio signal not include a frequent utterance, ASR processing may proceed in parallel by both a local device and a remote device. In this manner, the remote device may begin processing audio data sooner and will not be delayed by the local device transmitting audio data only after the audio signal has been processed for identification of a frequently used utterance. In this aspect, speech model matching may be performed by the local device or cellular phone, as illustrated in FIG. 13. As shown in FIG. 13, the local device receives an audio signal input, as shown in block 1302. Upon receiving the audio signal, the local device compares the audio signal to one or more speech recognition models for frequently spoken phrases, as shown in block 1304, and simultaneously transmits the audio signal to the remote device for ASR processing in parallel, as shown in block 1306. The local device makes a determination as to whether the audio signal matches one of the speech recognition models for the frequently spoken phrases, as shown in block 1308. When the local device determines the audio signal matches a frequently spoken phrase corresponding to one of the speech recognition models, the local device processes the phrase, as shown in block 1310. The local device may also transmit a cancel command to the remote device informing the remote device that the remote device need not perform ASR processing on at least the portion of the audio signal including the frequent phrase, as shown in block 1312.

When the local device determines the audio signal does not match a frequently spoken phrase of one of the speech recognition models, the local device may wait to receive the speech recognition results from the remote device, as shown in block 1314. Upon receiving the results, the local device processes the results, as shown in block 1316. As described above, the processing of the results may include executing a command. The command may be a search request, a command to play music, a command to purchase a good or item, and/or the like.

While the speech recognition models are described as describing phrases frequently spoken by the user, the speech recognition models may describe frequently spoken phonemes, words, non-speech noises, and/or other commands that may be executed by the local device. The remote device need actually be physically remote, the network communication described above is merely illustrative. The remote device may be part of or integrated with the local device, the remote device may be connected to the local device via a wired connection or in communication with the local device over a wireless network, and the remote device may be in communication with the local device in other configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A system for performing speech recognition comprising a local device and a remote device, the system configured to perform actions comprising:
   receiving a plurality of spoken utterances by a local device during a period of use of the local device;
   determining a first frequently spoken utterance and a second frequently spoken utterance from the plurality of spoken utterances, wherein the determining is based on a number of times each of the first frequently spoken utterance and the second frequently spoken utterance were received by the local device during the period of use;
   creating a first model for the first frequently spoken utterance and a second model for the second frequently spoken utterance;
   receiving a first spoken utterance by the local device;
   sending a representation of the first spoken utterance from the local device to a remote device;
   determining, by the local device, that the first spoken utterance corresponds to the first frequently spoken utterance, wherein the determining is based at least in part on the first model and the second model;
   sending, by the local device, a cancellation request to the remote device in response to determining, by the local device, that the first spoken utterance corresponds to the first frequently spoken utterance, wherein the cancellation request indicates that the remote device need not perform speech recognition on the representation of the first spoken utterance;
   performing an action corresponding to the first spoken utterance;
   receiving a second spoken utterance by the local device;
   determining, by the local device, that the second spoken utterance does not correspond to the first frequently spoken utterance and that the second spoken utterance does not correspond to the second frequently spoken utterance, wherein the determining is based at least in part on the first model and the second model;
   sending a representation of the second spoken utterance from the local device to the remote device;
   performing speech recognition on the representation of the second spoken utterance by the remote device; and
   performing an action corresponding to the second spoken utterance.

2. The method of claim 1, wherein determining the first frequently spoken utterance comprises counting a number of instances of each utterance of the plurality of spoken utterances and selecting an utterance with a largest count.

3. The method of claim 1, wherein creating the first model for the first frequently spoken utterance comprises creating a hidden Markov model and wherein determining, by the local device, that the first spoken utterance corresponds to the first frequently spoken utterance comprises computing a score using a Viterbi algorithm.

4. The method of claim 3, wherein performing the action corresponding to the first spoken utterance comprises playing music.

5. A computer-implemented method, comprising:
   receiving a plurality of spoken utterances during a period of use of a local device;
   storing, by the local device, a speech model corresponding to a frequently spoken utterance, the frequently spoken utterance comprising one of the plurality of spoken utterances and being determined based on a number of times the frequently spoken utterance was received by the local device during the period of use;
   receiving, by the local device, first audio data comprising first speech;
   transmitting, by the local device, a representation of the first audio data to a remote device;
   determining, by the local device, that the first speech includes the frequently spoken utterance based at least in part on the speech model;
   sending, by the local device, a cancellation request to the remote device in response to determining that the first speech includes the frequently spoken utterance, wherein the cancellation request indicates that the remote device need not perform speech recognition on the representation of the first audio data;
   receiving, by the local device, second audio data comprising second speech;
   determining, by the local device, that the second speech does not include the frequently spoken utterance; and
   transmitting, by the local device, a representation of the second audio data to the remote device for processing, wherein the remote device performs speech recognition on the second audio data.

6. The method of claim 5, wherein the frequently spoken utterance comprises a command, and wherein the method further comprises executing the command.

7. The method of claim 5, further comprising:
   receiving speech recognition results from the remote device, wherein the speech recognition results correspond to the representation of the second audio data; and
   executing a command, wherein the second speech comprises the command.

8. The method of claim 5, wherein the determining that the first speech includes the frequently spoken utterance comprises comparing a representation of the first audio data to the speech model corresponding to the frequently spoken utterance.

9. The method of claim 5, wherein the representation of the second audio data comprises one of a portion of the second audio data or feature vectors computed from at least a portion of the second audio data.

10. The method of claim 5, further comprising:
    receiving a second plurality of utterances during a second period of use of the local device; and
    updating the speech model based on a number of times a second frequently spoken utterance was received by the local device, wherein the second frequently spoken utterance is one of the second plurality of utterances.

11. A computing device, comprising:
    at least one processor;
    a memory device including instructions operable to be executed by the at least one processor to perform a set of actions, configuring the processor:
    to receive a plurality of spoken utterances during a period of use of the device;
    to store a speech model corresponding to a frequently spoken utterance, the frequently spoken utterance being one of the plurality of spoken utterances and being determined based on a number of times the frequently spoken utterance was received by the device during the period of use;
    to receive first audio data comprising first speech;
    to transmit a representation of the first audio data to a remote device;
    to determine that the first speech includes the frequently spoken utterance based at least in part on the speech model;
    to send a cancellation request to the remote device in response to determining that the first speech includes the frequently spoken utterance, wherein the cancellation request indicates that the remote device need not perform speech recognition on the representation of the first audio data;

to receive second audio data comprising second speech;

to determine that the second speech does not include the frequently spoken utterance; and to transmit a representation of the second audio data to the remote device for processing, wherein the remote device performs speech recognition on the second audio data.

12. The computing device of claim 11, wherein the frequently spoken utterance comprises a command, and wherein the at least one processor is further configured to execute the command.

13. The computing device of claim 11, wherein the at least one processor is further configured:

to receive speech recognition results from the remote device, wherein the speech recognition results correspond to the representation of the second audio data; and to executing a command, wherein the second speech comprises the command.

14. The computing device of claim 11, wherein the at least one processor is further configured to determine that the first speech includes the frequently spoken utterance by comparing a representation of the first audio data to the speech model.

15. The computing device of claim 11, wherein the at least one processor is further configured:

to receive a second plurality of utterances during a second period of use of the local device; and to update the speech model based on a number of times a second frequently spoken utterance was received by the local device, wherein the second frequently spoken utterance is one of the second plurality of utterances.

16. A non-transitory computer-readable storage medium storing processor-executable instructions for controlling a computing device, comprising:

program code to receive a plurality of spoken utterances during a period of use of the device;

program code to store a speech model corresponding to a frequently spoken utterance, the frequently spoken utterance being one of the plurality of spoken utterances and being determined based on a number of times the frequently spoken utterance was received by the device during the period of use;

program code to receive first audio data comprising first speech;

program code to transmit a representation of the first audio data to a remote device;

program code to determine that the first speech includes the frequently spoken utterance based at least in part on the speech model;

program code to send a cancellation request to the remote device in response to determining that the first speech includes the frequently spoken utterance, wherein the cancellation request indicates that the remote device need not perform speech recognition on the representation of the first audio data;

program code to receive second audio data comprising second speech;

program code to determine that the second speech does not include the frequently spoken utterance; and program code to transmit a representation of the second audio data to the remote device for processing, wherein the remote device performs speech recognition on the second audio data.

17. The non-transitory computer-readable storage medium of claim 16, wherein the frequently spoken utterance comprises a command, and the non-transitory computer-readable storage medium further comprises program code to execute the command.

18. The non-transitory computer-readable storage medium of claim 16, further comprising:

program code to receive speech recognition results from the remote device, wherein the speech recognition results correspond to the representation of the second audio data; and program code to execute a command, wherein the second speech comprises the command.

19. The non-transitory computer-readable storage medium of claim 16, wherein the program code to determine that the first speech includes the frequently spoken utterance includes program code to compare a representation of the first audio data to the speech model.

20. The non-transitory computer-readable storage medium of claim 16, further comprising:

program code to receive a second plurality of utterances during a second period of use of the local device; and program code to update the speech model based on a number of times a second frequently spoken utterance was received by the local device, wherein the second frequently spoken utterance is one of the second plurality of utterances.

* * * * *